US012595156B2

(12) United States Patent
Solomon et al.

(10) Patent No.: US 12,595,156 B2
(45) Date of Patent: Apr. 7, 2026

(54) VACUUM LIFTER FOR LIFTING OBJECTS LOCATED IN CONFINED SPACES BELOW GRADE

(71) Applicant: Vacuworx Global, LLC, Tulsa, OK (US)

(72) Inventors: William J. Solomon, Tulsa, OK (US); Mason Owen, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 145 days.

(21) Appl. No.: 18/483,655

(22) Filed: Oct. 10, 2023

(65) Prior Publication Data

US 2024/0116737 A1 Apr. 11, 2024

Related U.S. Application Data

(60) Provisional application No. 63/378,894, filed on Oct. 10, 2022.

(51) Int. Cl.
*B66C 1/02* (2006.01)

(52) U.S. Cl.
CPC .......... *B66C 1/0243* (2013.01); *B66C 1/0281* (2013.01)

(58) Field of Classification Search
CPC ....... B66C 1/0243; B66C 1/0281; B66C 1/30; B65H 67/065; B65G 47/91; B66F 9/186; B66F 11/00; F16L 1/036; F16L 1/065; F16L 1/09; B25B 9/00; B25B 33/00
See application file for complete search history.

(56) References Cited

U.S. PATENT DOCUMENTS

| | | | | | |
|---|---|---|---|---|---|
| 1,975,194 | A | * | 10/1934 | Courtney | B66C 1/663 294/81.51 |
| 2,537,812 | A | | 1/1951 | Boehme | |
| 3,106,358 | A | * | 10/1963 | Lehmann | E04H 17/266 242/527 |
| 3,423,119 | A | * | 1/1969 | Stanley | B65G 47/91 294/64.2 |
| 3,514,146 | A | * | 5/1970 | Zweifel | B66C 1/101 294/81.21 |
| 3,630,561 | A | * | 12/1971 | Schuler | B66C 1/0262 294/65 |
| 3,920,194 | A | * | 11/1975 | Parsen | B65H 49/321 242/598.5 |
| 4,014,447 | A | * | 3/1977 | Whiteman | B66F 9/186 294/81.53 |

(Continued)

FOREIGN PATENT DOCUMENTS

JP S5314760 A 12/1978

*Primary Examiner* — Gregory W Adams
(74) *Attorney, Agent, or Firm* — GableGotwals

(57) ABSTRACT

A vacuum lifter of this disclosure includes a spreader bar having a lifting lug at a top end and pad hanger locations at a bottom end; a pair of legs rotatably connected at a corresponding end of the spreader bar, each leg including a foot at a lower end of the leg; each leg having a first locking position in which the foot is below the spreader bar and a second locking position in which the foot is above the spreader bar; and a pair of vacuum pads adapted for connection to a vacuum source and to the pad hanger locations of the spreader bar. The spreader bar may be extendable. The vacuum source may be mounted on the spreader bar. The vacuum lifter is useful for lifting objects out of confined spaces below grade.

18 Claims, 7 Drawing Sheets

(56) References Cited

U.S. PATENT DOCUMENTS

| | | | | | |
|---|---|---|---|---|---|
| 4,105,240 | A * | 8/1978 | Steenson | B66C 1/422 294/67.31 |
| 4,685,714 | A | 8/1987 | Hoke | |
| 4,787,812 | A | 11/1988 | Gopfert | |
| 5,024,477 | A * | 6/1991 | Slezak | B66C 1/30 294/81.4 |
| 5,163,727 | A * | 11/1992 | Slezak | B65H 67/065 294/81.4 |
| 5,452,872 | A * | 9/1995 | Barnes | B05B 15/622 248/81 |
| 5,707,094 | A * | 1/1998 | Gower | B66D 3/18 294/188 |
| 5,769,589 | A * | 6/1998 | Lubbers | B66C 19/002 414/268 |
| 6,280,119 | B1 * | 8/2001 | Ryan | B66C 1/427 405/175 |
| 6,299,100 | B1 * | 10/2001 | Cloud | B65H 49/32 242/391.1 |
| 7,270,293 | B1 * | 9/2007 | Karoly | B65H 49/321 242/598.5 |
| 8,109,550 | B1 * | 2/2012 | Benjamin | B66D 3/18 294/67.31 |
| 2005/0095106 | A1 | 5/2005 | Pearce | |
| 2011/0293397 | A1 | 12/2011 | Lomerson, Jr. | |
| 2017/0113904 | A1 * | 4/2017 | Solomon | B66C 3/005 |
| 2022/0194248 | A1 | 6/2022 | Kalouche | |

* cited by examiner

VACUUM LIFTER FOR LIFTING OBJECTS LOCATED IN CONFINED SPACES BELOW GRADE

CROSS-REFERENCE TO CO-PENDING APPLICATIONS

This application claims priority to U.S. 63/378,894 filed Oct. 10, 2022, the content of which is incorporated herein by reference.

BACKGROUND

This disclosure is in the field of vacuum lifters for use in lifting objects located in confined spaces below grade, including objects located in holes such as, but not limited, to burial vault lids.

For example, when preparing or expanding a veteran cemetery, the US Department of Veterans Affairs National Cemetery Administration uses earth moving equipment to excavate a large section of ground and then positions burial vaults having geo positional markers in the excavation. It then buries all of the vaults, the vault lids being covered underground by about 3 feet of dirt. When a veteran passes, the ground above the vault where the veteran is to be buried is excavated to expose the lid. Workers will then remove the lid for placement of the casket.

Current practice for removing the lid requires two workers standing on top of the lid to connect, at each end of the lid, the hooks of a spreader bar or beam to the lid's lift handles. The workers remain on the lid to ensure the hooks remain engaged with the handles until the chain connected to the spreader bar is in full tension, at which time the workers exit the hole. As the lid clears the hole, the workers then use their shovels to help guide the lid and reduce its sway to where the lid will be temporarily placed.

After the casket is lowered into the vault, the workers again use their shovels to help guide the lid back into place over and onto a burial vault lowering device. Once in place onto the device, the tension is removed from the chain and the workers remove the hooks from the lid handles. The vault lid is then lowered using the lowering device and covered once again by about 3 feet of dirt.

SUMMARY

Embodiments of a vacuum lifter of this disclosure are especially adapted for lifting objects located in confined spaces below grade and include legs that remain with the lifter and pivot or rotate upward into a locked position above the spreader bar when the lifter is in a deployed state and rotate downward into a locked position below the spreader bar when the lifter is in a stowed state. The length of legs is long enough to keep the vacuum lifter pads from contacting the ground.

In embodiments, the vacuum lifter includes a spreader bar having a lifting lug at a top end and pad hanger locations at a bottom end; a pair of legs rotatably connected at a corresponding end of the spreader bar, each leg including a foot at a lower end of the leg; each leg having a first locking position in which the foot is below the spreader bar and a second locking position in which the foot is above the spreader bar; and a pair of vacuum pads adapted for connection to a vacuum source and to the pad hanger locations of the spreader bar.

The spreader bar may extendable at each end in applications where additional distance between the pads is needed. The spreader bar may also include fork lift pockets or gussets. The vacuum source, which can be battery powered, can be a portable vacuum source mounted on the spreader bar.

The pair of legs is rotatably connected at a corresponding end of the spreader bar, each leg may include a cylindrical bushing at an upper end of the leg, the bushing having a thru hole. A pair of cylindrical tubes may be located along a top end of the spreader bar, with each cylindrical tube at a corresponding end of the spreader bar. The cylindrical tube is sized to receive a corresponding one of the cylindrical bushings and has a thru hole. A pair of pins, which may be tethered to the spreader bar, are sized for insertion into the thru holes of the tube and bushing. The pair of legs is in a locked position when the pin is inserted into the thru holes. One or both legs may include a tool holder connected to the leg at an oblique angle to the leg.

Embodiments of a method of this disclosure for lifting an object from below grade to above grade includes positioning a vacuum lifter so that it straddles the object located below grade; after the positioning, lowering the vacuum lifter until vacuum pads of the vacuum lifter contact the object; after the contact, applying a vacuum to the vacuum pads; and during the applying, raising the vacuum lifter until the object is above grade. The object may be a burial vault lid.

NUMBERING AND ELEMENTS USED IN THE DRAWINGS

Figure 1:
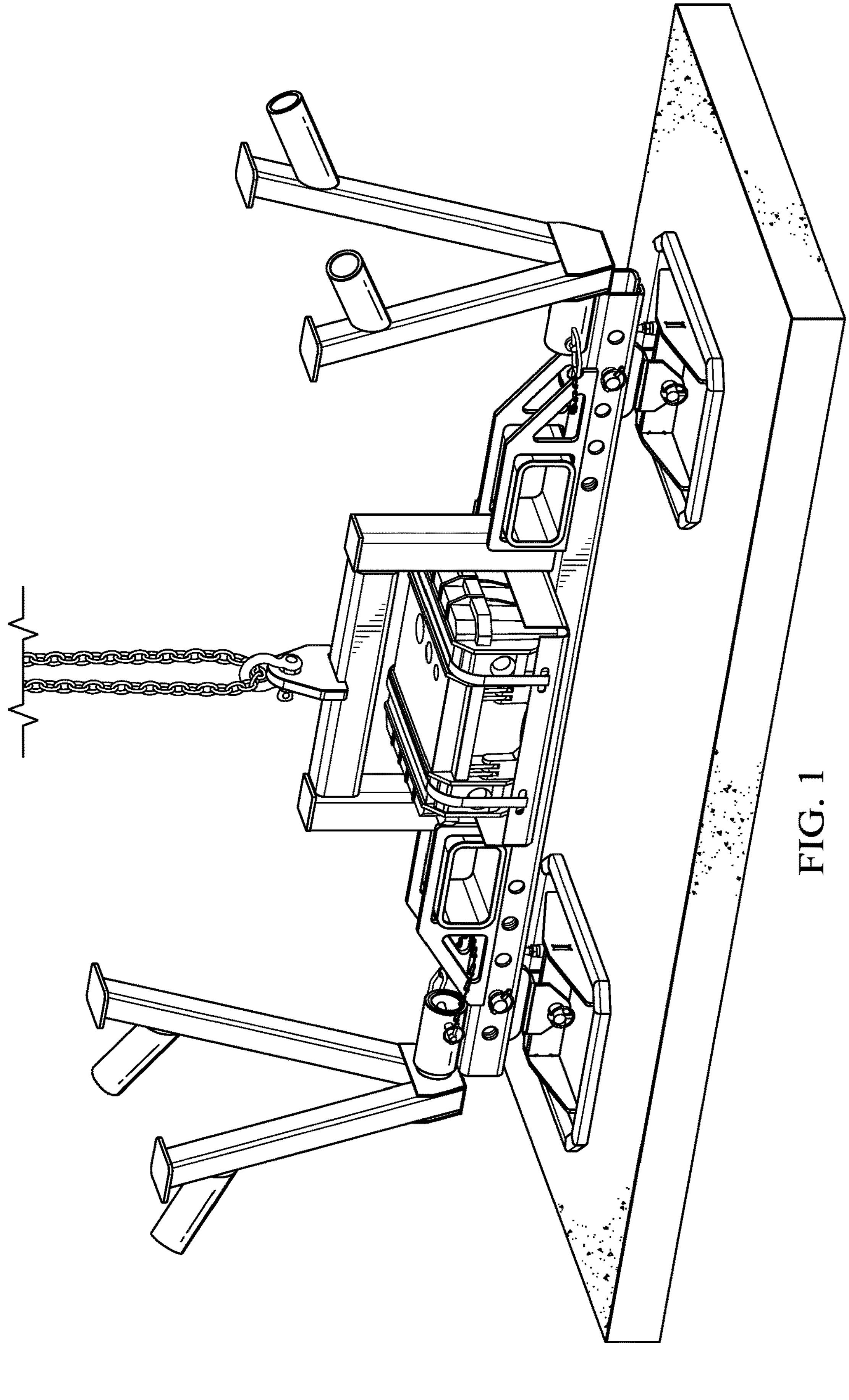
FIG. 1 is a perspective view of a vacuum lifter of this disclosure when in a deployed lifting (or lowering) state.
Figure 2:
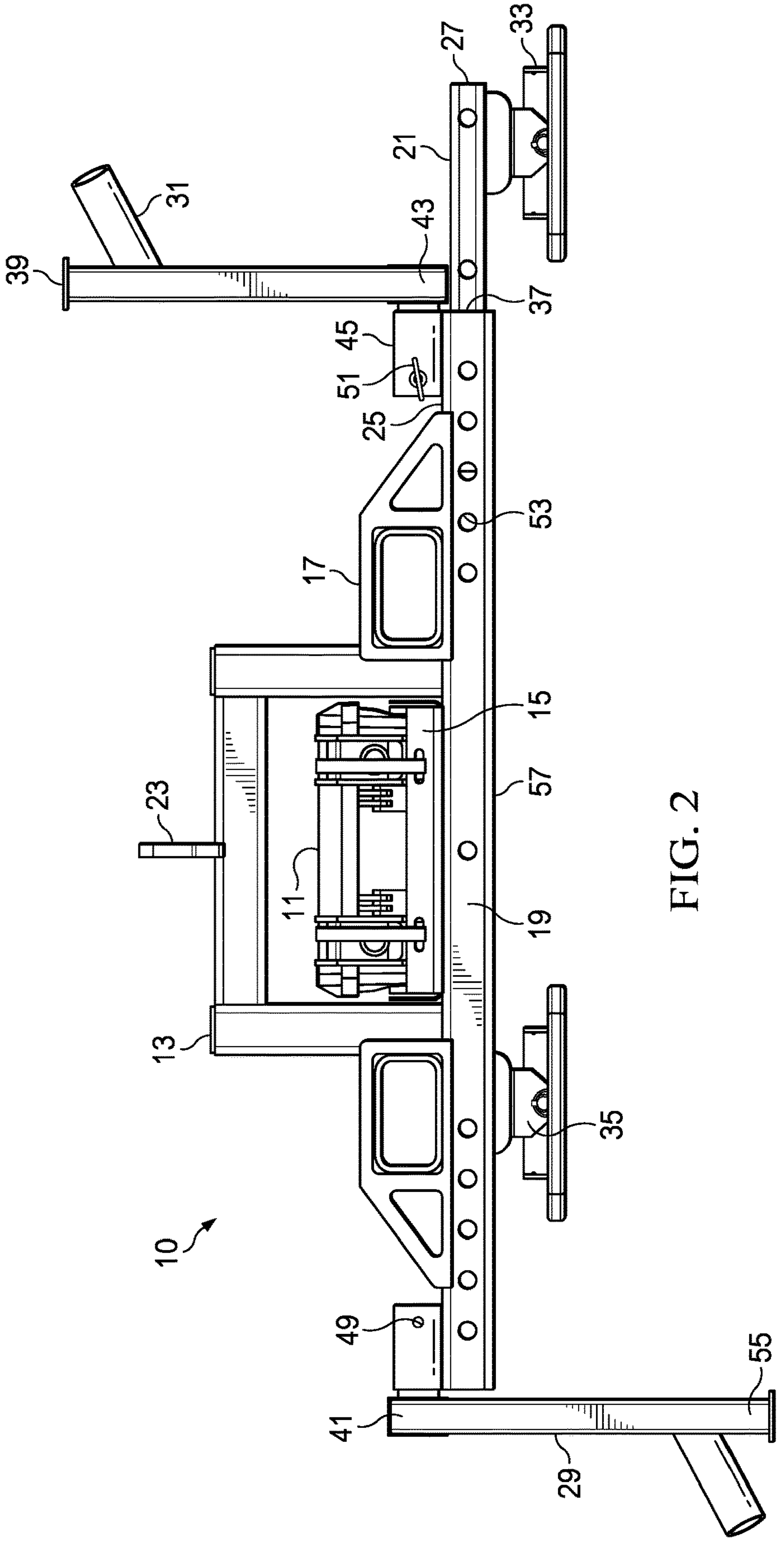
FIG. 2 is a front elevation view of a vacuum lifter of this disclosure. One leg is shown as it would appear when the lifter is in a stowed state. Another leg is shown as it would appear when the lifter is in a deployed (lifting) state.
Figure 3:
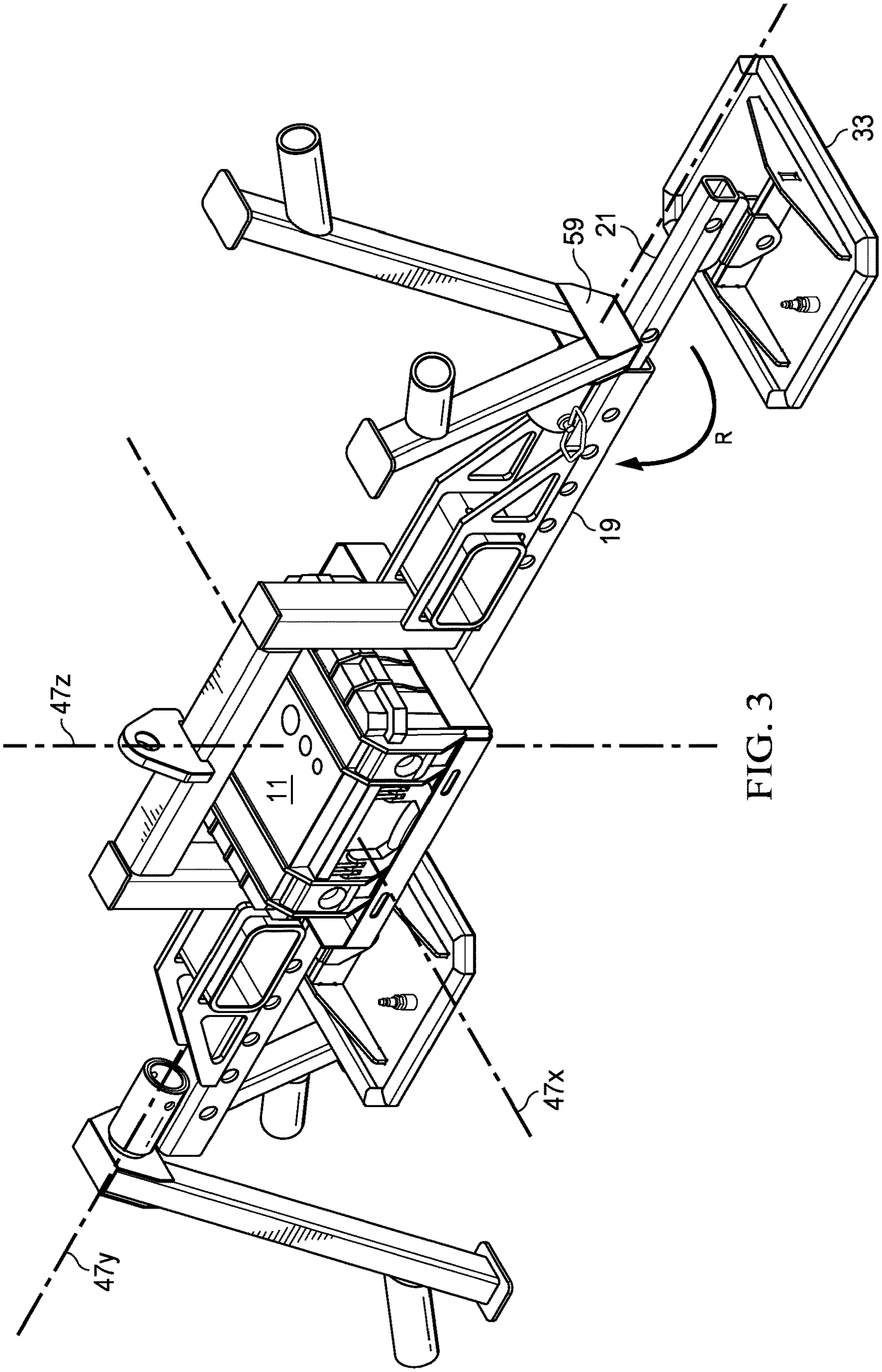
FIG. 3 is an isometric view of the vacuum lifter of FIG. 2.
Figure 4:
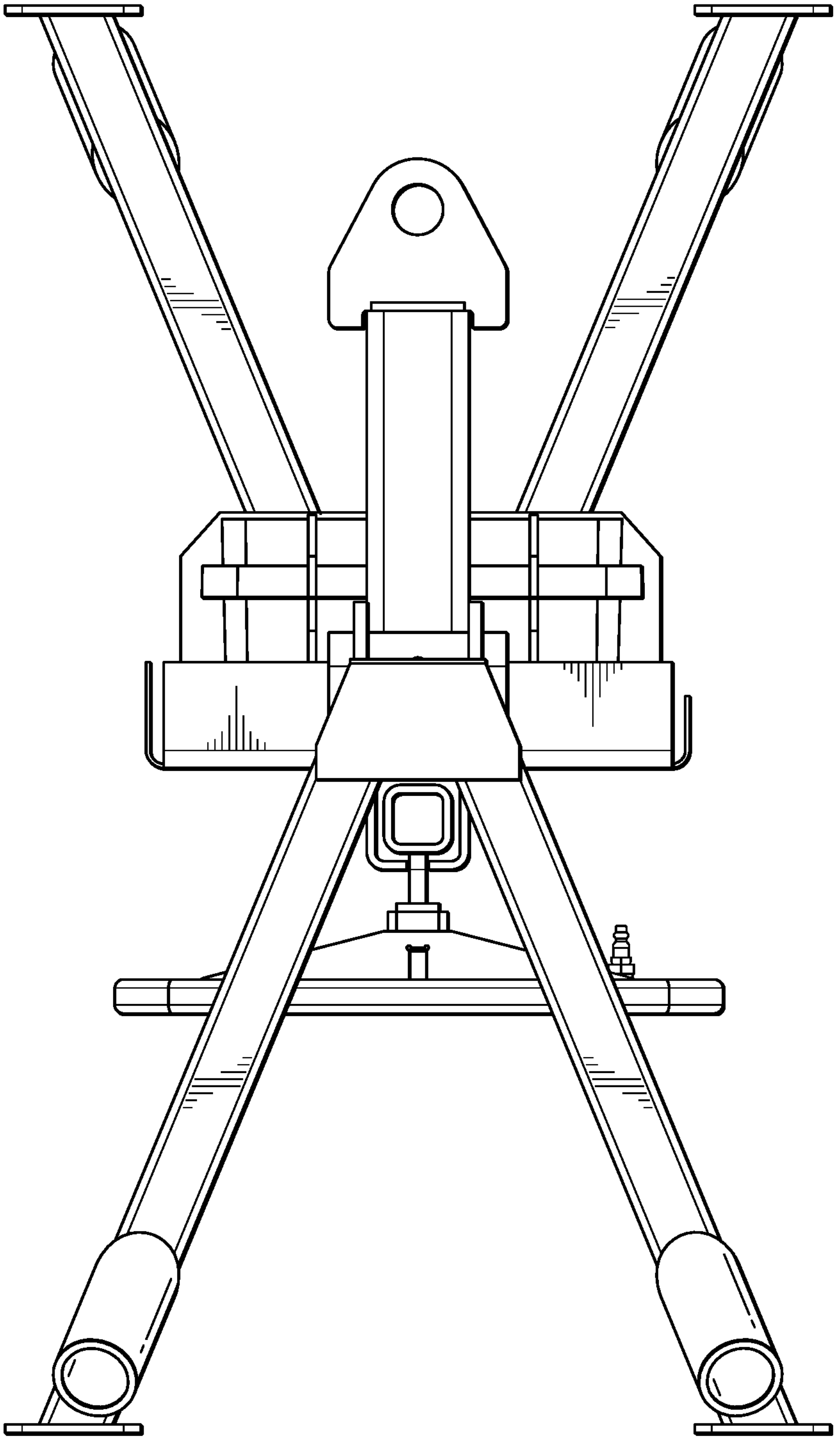
FIG. 4 is a side elevation view of the vacuum lifter of FIG. 2.
Figure 5:
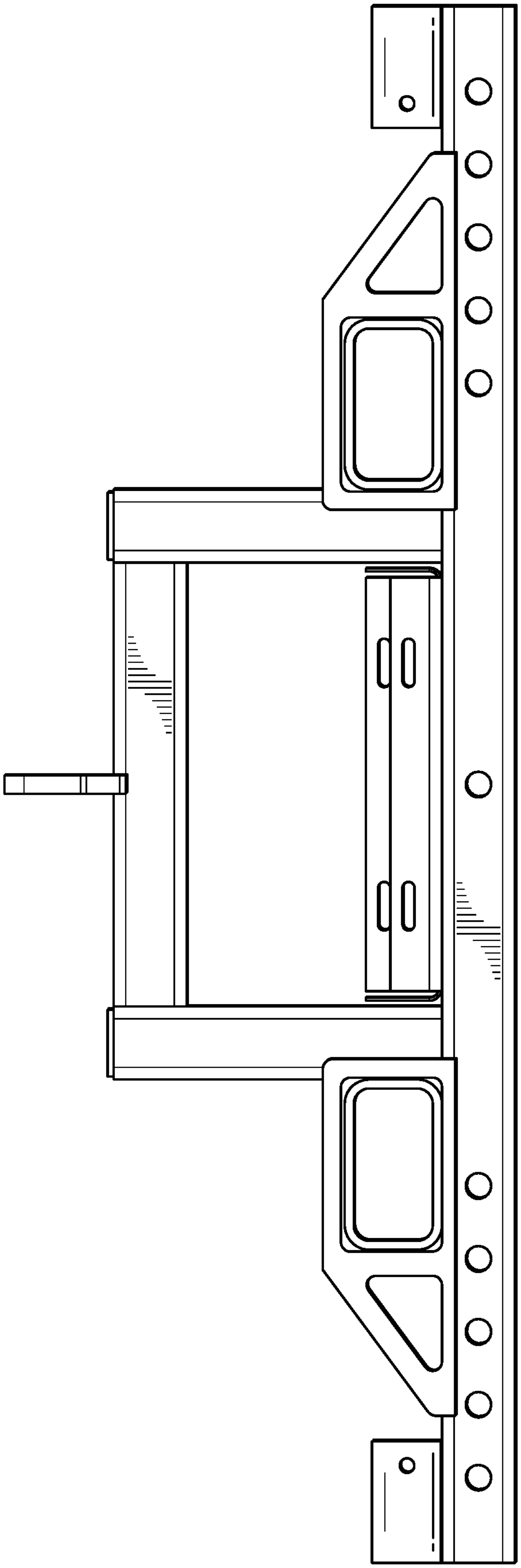
FIG. 5 is a front elevation view of the spreader bar of the vacuum lifter of FIG. 2.
Figure 6:
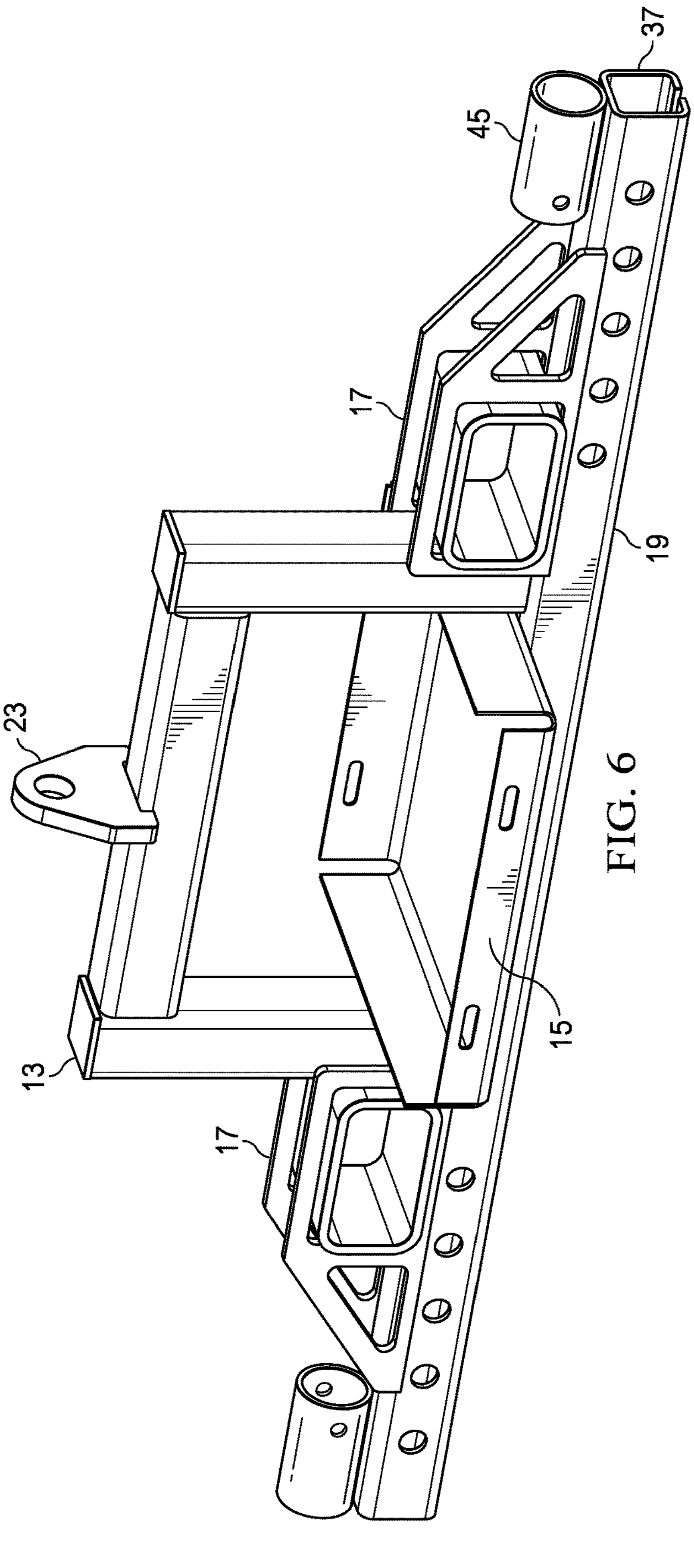
FIG. 6 is an isometric view of the spreader bar of FIG. 5.
Figure 7:
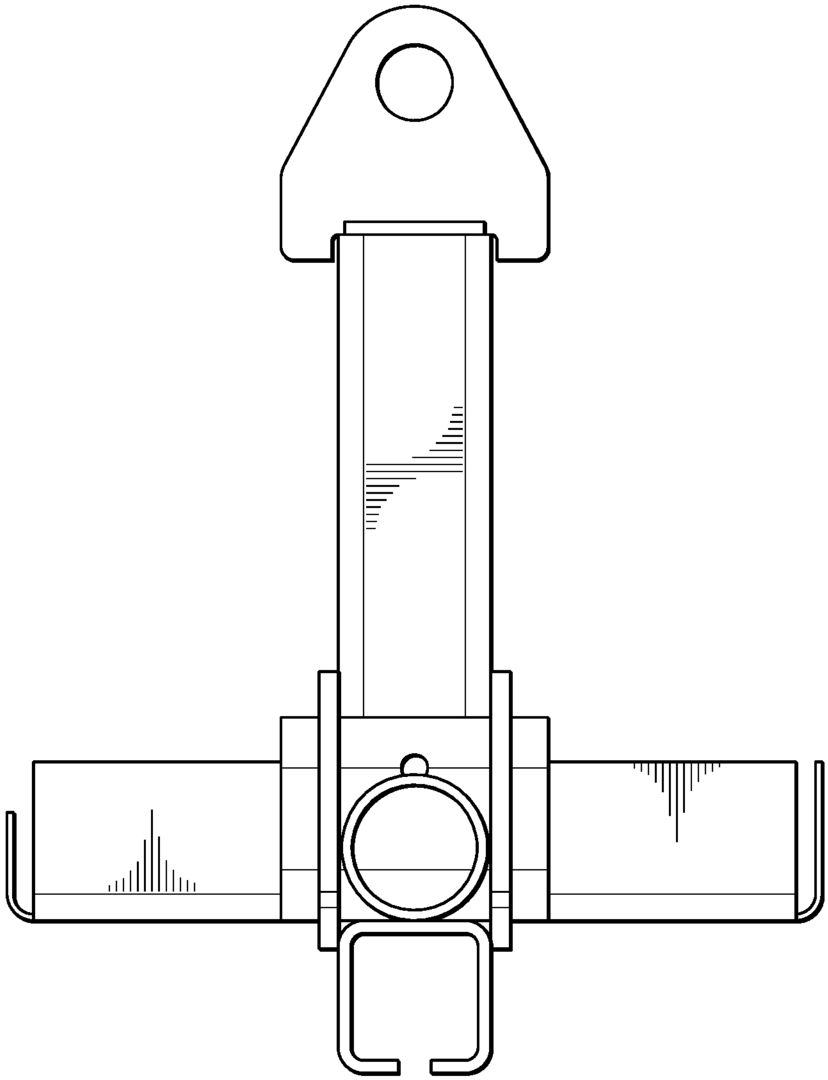
FIG. 7 is a side elevation view of the spreader bar of FIG. 5.

10 vacuum lifter
11 vacuum source
13 beam assembly
15 central pocket
17 forklift pockets or gussets
19 spreader bar
21 extendable bar
23 lifting lug
25 top end (upper side) of spreader bar
27 end of extendable bar
29 lifter legs
31 tool pockets
33 vacuum lifter pads
35 pad hangers
37 fixed end of the spreader bar
39 foot of lifter leg
41 bushing
43 upper end of lifter leg
45 tube
47Lx lateral centerline of vacuum lifter

47Ly longitudinal centerline of vacuum lifter
47$z$ vertical centerline of vacuum lifter
49 thru hole
51 pin
53 pad hanger locations
55 lower end of lifting leg
57 bottom end (lower side) of spreader bar
59 bracket
R rotational direction of pair of legs

DETAILED DESCRIPTION

Referring to the drawings, embodiments of a vacuum lifter 10 of this disclosure include a vacuum source 11 connected to a beam assembly 13 comprising a central pocket 15 for receiving the vacuum source 11, lift pockets or gussets 17 on each side of the central pocket 15 for receiving forks of a forklift, a spreader bar 19 including an extendable bar 21 at each end, a lifting lug 23 connected to the top side 25 of the spreader bar 19, two pairs of lifter legs 29 rotationally connected to the spreader bar 19 and including tool pockets 31, and vacuum lifter pads 33 having pad hangers 35 adapted for connection to the spreader bar 19. The lifter legs 29 stay with the lifter 10 during its use. Hoses (not shown) of a kind known in the art connect the vacuum source 11 to the lifter pads 33. A vacuum filter element (not shown) of a kind known in the art filters any debris drawn in by the lifter pads 33.

In embodiments, the vacuum source 11 may be a VACU-WORX® PHD™ battery powered vacuum source. The source 11 may be wireless remote controlled, have a lift capacity of 2,500 lb (1.13 tonne), and include a two dual-stage vacuum pumps and a 12 V 30 Ah rechargeable LFP battery of a kind known in the art. In other embodiments, the vacuum source 11 may be connected to the spreader bar and powered by the host machine.

A pair of lifter legs 29 are located at each end 27 of the spreader bar 19. The lifter legs 29 form a V-shape like that typically seen used on sawhorses. When the vacuum lifter 10 is in a stowed position, the legs 29 are in rotated downward position and the foot 39 of each leg 29 is located below the spreader bar 19 in contact with the ground. The legs 29 are of adequate height to provide clearance so that the vacuum lifter pads 33 do not contact the ground when the lifter 10 is stowed or parked. When the vacuum lifter 10 is in a deployed position, the legs 29 are in a rotated upward position so that the feet 39 are above the spreader bar 19.

Rotation of each pair of legs 29 is accomplished by way of a bushing 41, located at the upper end 43 of the legs 29, that rests inside a tube 45 connected to the top end (upper side) 25 of the spreader bar 19. The bushing 41 can be connected to a leg bracket 59. The bushing 41 and tube 45 include a thru hole 49 for receiving a pin 51. When the thru holes 49 are aligned with one another and the pin 51 is inserted, the legs 29 are in a locked position and temporarily prevented from rotation until such time as the pin 51 is removed. The pin 51 may be tethered to the spreader bar.

The legs 29 also include a tool pocket 31 arranged at an oblique angle to the leg 29. The tool pocket 31 may be a round or square tube. When in the stowed position, the tool pocket 31 is angled downwardly. When in the deployed position with the leg 29 rotated upward, the tool pocket 31 is angled upwardly. The tool pocket 31 may be sized to receive the handle of a shovel or rake.

The spreader bar 19 and extendable bars 21 provide pad hanger locations 53 along their respective lengths. The extender bar 21 can extend outward from a fixed end 37 of the spreader bar 19 where needed—thereby placing the end 27 of the extendable bar 21 past the fixed end 37—to increase the distance between the vacuum pads 33. In embodiments, each pair of legs 29 is rotated into the upward position prior to the extendable bar 21 being extended and downward after the extendable bar 21 is retracted.

When a pad hanger 35 is inserted into one of the hanger locations 53, the hanger 35 passes through the spreader bar 19 and the extendable bar 21 to prevent linear movement of the extendable pad hanger 21. The extendable bar 21 may add 12 to 24 inches (~30.5 to 60.1 cm) of length to each side of the spreader bar 19. The spreader bar may be in a range of 60 to 72 inches (~152.4 to 182.9 cm).

Embodiments of a method of this disclosure for lifting an object from below grade to above grade includes positioning the vacuum lifter 10 so that it straddles the object located below grade; after the positioning, lowering the vacuum lifter 10 until vacuum pads 33 of the vacuum lifter contact the object; after the contact, applying a vacuum to the vacuum pads 33; and during the applying, raising the vacuum lifter 10 until the object is above grade. The positioning may involve extending the bar 21. The vacuum pads 33, when positioned, reside within the perimeter or border of the object. The lowering may be by way of a boom, the boom connected to the lifter 10 by a chain.

The object may be a burial vault lid. After the raising, the boom may rotate so that the vault lid is out of the way for access to the burial vault. Once a casket has been lowered into the vault, the boom may rotate back for lowering the vault lid back onto the vault.

While embodiments of a vacuum lifter of this disclosure have been described, modifications may be made by persons of skill without departing from the invention, the scope of which is defined by the following claims, the elements of which are entitled to their full range of equivalents.

The invention claimed is:

1. A vacuum lifter comprising:

a spreader bar including a lifting lug at a top end and pad hanger locations at a bottom end;

a pair of legs rotatably connected at a corresponding end of the spreader bar, each leg rotatable about a central longitudinal axis of the spreader bar and including a foot at a lower end of the leg;

each leg having a first locking position in which the foot is below the spreader bar and a second locking position in which the foot is above the spreader bar; and a pair of vacuum pads adapted for connection to a vacuum source and to the pad hanger locations of the spreader bar.

2. The vacuum lifter of claim 1, further comprising a pair of extendable bars including pad hanger locations, each extendable bar housed within the spreader bar and extendable from a corresponding end of the spreader bar.

3. The vacuum lifter of claim 1, further comprising:

each leg including a cylindrical bushing at an upper end of the leg, the spreader bar including a pair of cylindrical tubes, each cylindrical tube located along a top end of the spreader bar at a corresponding end of the spreader bar, the cylindrical tube sized to receive a corresponding one of the cylindrical bushing.

4. The vacuum lifter of claim 3, further comprising the cylindrical tube and the cylindrical bushing each having a thru hole, and a pair of pins, each pin sized for insertion into the thru holes of the cylindrical tube and the cylindrical bushing, the pair of legs being in a locked position when the pin is inserted into a corresponding pair of the thru holes.

5. The vacuum lifter of claim 1, further comprising the vacuum source connected to the spreader bar.

6. The vacuum lifter of claim 1, wherein the vacuum source is a battery powered vacuum source.

7. The vacuum lifter of claim 1, wherein at least one leg includes a tool holder connected to the leg at an oblique angle to the leg.

8. The vacuum lifter of claim 1, wherein the spreader bar includes a pair of fork lift pockets.

9. A method for lifting an object from below grade to above grade using the vacuum lifter of claim 1, the method comprising:

positioning a vacuum lifter above the object located below grade;

after the positioning, lowering the vacuum lifter until the vacuum pads of the vacuum lifter contact the object;

prior to the lowering, rotating each leg of the vacuum lifter between the first locking position and the second locking position;

after the contact, applying a vacuum to the vacuum pads; and during the applying, raising the vacuum lifter until the object is above grade.

10. The method of claim 9, further comprising, the positioning including extending the pair of extendable bars.

11. The method of claim 9, wherein the first locking position is a stowed position.

12. The method of claim 9, further comprising, after the raising, and during a continued applying of the vacuum, moving the object to a different location.

13. The method of claim 9, wherein the object is a burial vault lid.

14. A vacuum lifter comprising:

a spreader bar including a lifting lug at a top end and pad hanger locations at a bottom end;

a pair of legs rotatably connected at a corresponding end of the spreader bar, each leg rotatable about a central longitudinal axis of the spreader bar and including a foot at a lower end of the leg;

each leg having a first locking position in which the foot is below the spreader bar and a second locking position in which the foot is above the spreader bar, each leg including a cylindrical bushing at an upper end of the leg, a pair of vacuum pads adapted for connection to a vacuum source and to the pad hanger locations of the spreader bar, the spreader bar further including a pair of cylindrical tubes, each cylindrical tube located along a top end of the spreader bar at a corresponding end of the spreader bar, the cylindrical tube sized to receive a corresponding one of the cylindrical bushing;

the cylindrical tube and the cylindrical bushing each having a thru hole, and a pair of pins, each pin sized for insertion into the thru holes of the cylindrical tube and the cylindrical bushing, the pair of legs being in a locked position when the pin is inserted into a corresponding pair of the thru holes.

15. A vacuum lifter comprising:

a spreader bar including a lifting lug at a top end and pad hanger locations at a bottom end;

two pairs of legs, each pair of legs rotatably connected at a corresponding end of the spreader bar and rotatable about a central longitudinal axis of the spreader bar, each leg including a foot at a lower end of the leg;

each pair of legs having a first locking position in which the foot is below the spreader bar and a second locking position in which the foot is above the spreader bar; and a pair of vacuum pads adapted for connection to a vacuum source and to the pad hanger locations of the spreader bar.

16. The vacuum lifter of claim 15, further comprising a pair of extendable bars including pad hanger locations, each extendable bar housed within the spreader bar and extendable from a corresponding end of the spreader bar.

17. The vacuum lifter of claim 15, further comprising:

each pair of legs including a cylindrical bushing at an upper end, the spreader bar including a pair of cylindrical tubes, each cylindrical tube located along a top end of the spreader bar at a corresponding end of the spreader bar, the cylindrical tube sized to receive a corresponding one of the cylindrical bushing.

18. The vacuum lifter of claim 17, further comprising the cylindrical tube and the cylindrical bushing each having a thru hole, and a pair of pins, each pin sized for insertion into the thru holes of the cylindrical tube and the cylindrical bushing, the pair of legs being in a locked position when the pin is inserted into a corresponding pair of the thru holes.

* * * * *